United States Patent [19]

Hagen et al.

[11] 4,123,185
[45] Oct. 31, 1978

[54] FLOATING BREAKWATER AND ENERGY COLLECTING SYSTEM

[76] Inventors: Alf R. Hagen, 16249 36th Ave., NE., Seattle, Wash. 98155; Eric C. Hagen, 11223 109th NE., Kirkland, Wash. 98033

[21] Appl. No.: 803,543

[22] Filed: Jun. 6, 1977

[51] Int. Cl.² .......................... E02B 9/08; F03C 1/26
[52] U.S. Cl. ....................................... 405/76; 405/26; 405/219; 9/8 P; 114/258; 290/42; 290/53; 417/100
[58] Field of Search ................... 61/20, 19, 5; 60/398; 417/100; 114/258, 230; 9/8 P; 290/53, 42, 43

[56] References Cited
U.S. PATENT DOCUMENTS

| 755,728 | 3/1904 | Weems | 61/20 |
|---|---|---|---|
| 960,478 | 6/1910 | Allard | 417/100 |
| 1,290,867 | 1/1919 | Arnold | 61/20 |
| 1,448,029 | 3/1923 | Larry et al. | 290/42 |
| 1,507,461 | 9/1924 | Chase | 61/20 |
| 1,750,224 | 3/1930 | King | 114/258 |
| 2,484,183 | 10/1949 | Paulson | 417/100 X |
| 3,200,255 | 8/1965 | Masuda | 290/42 |
| 4,023,515 | 5/1977 | Tharaldson | 9/8 P |

FOREIGN PATENT DOCUMENTS 456,662  6/1926  Fed. Rep. of Germany ........... 114/258

*Primary Examiner*—Jacob Shapiro
*Attorney, Agent, or Firm*—Seed, Berry, Vernon & Baynham

[57] ABSTRACT

A combination floating breakwater and wave energy collecting system in which a pair of joint floating spread wings are provided between which a vessel can be moored. The spread angle of the wings is adjustable and the wings can be jointly swung about their juncture so as to extend from the juncture generally in the direction of wave and wind travel so that the vee-shaped area between the wings is on the lee side. The wings have rows of improved wave energy collecting cells used to drive air turbines coupled to electric generators without intermediate compressed air storage and this energy conversion assists in dampening the wave action in the moorage zone between the wings.

10 Claims, 13 Drawing Figures

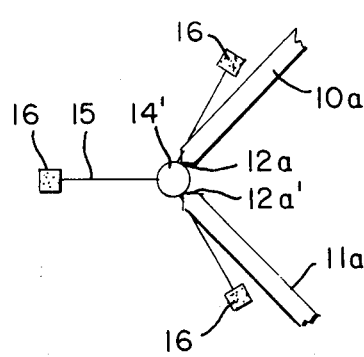
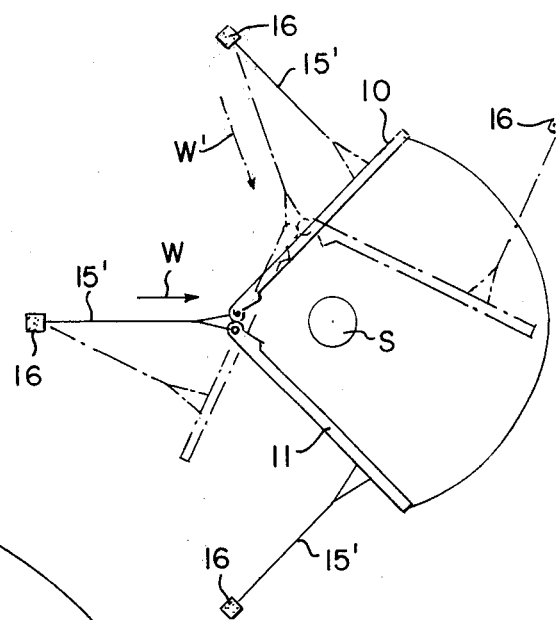
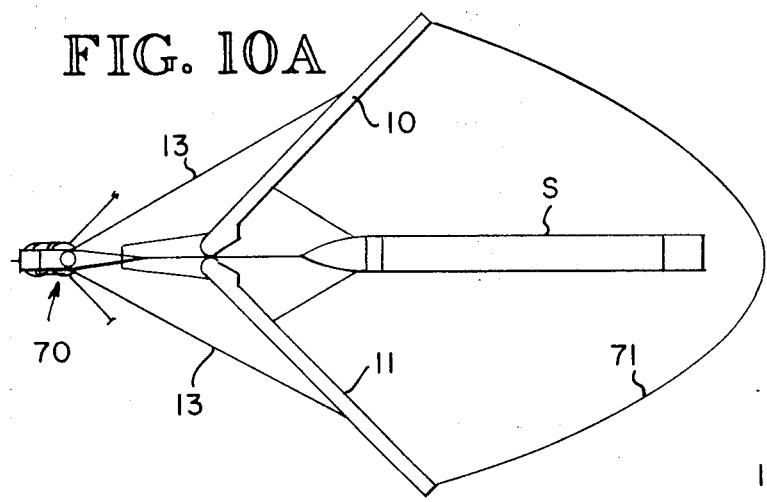
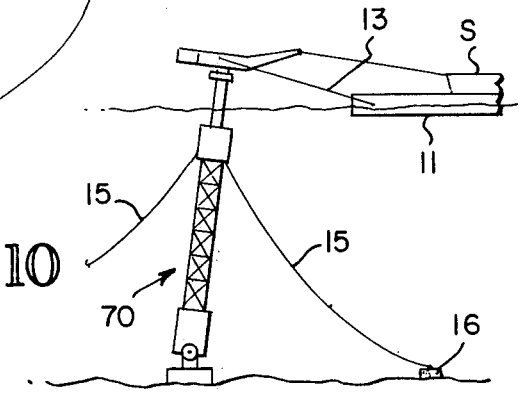
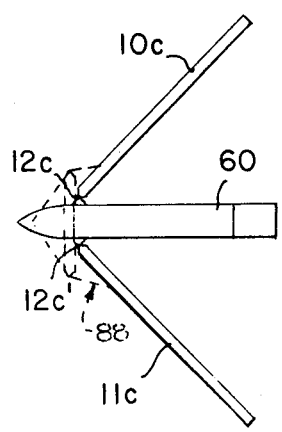
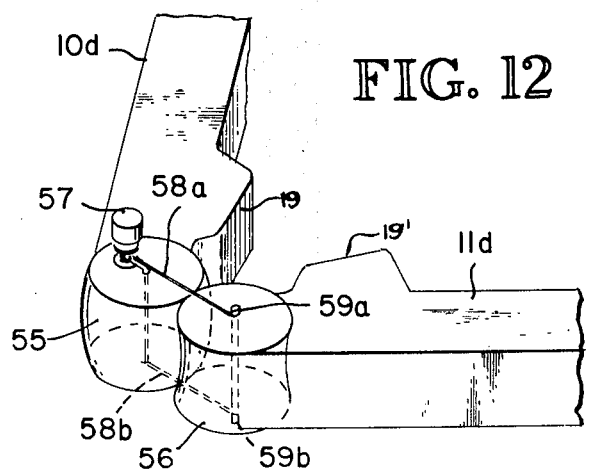

FLOATING BREAKWATER AND ENERGY COLLECTING SYSTEM

BACKGROUND OF THE INVENTION

1. Field of the Invention

The present invention relates to wave energy collection systems and to a combined floating breakwater and energy collecting system for use offshore (including large inland bodies of water) to provide a protected moorage for tankers, fishing fleets and other vessels and to provide a protected work area for offshore mining, oil and gas drilling and other offshore operations.

2. Description of the Prior Art

It has long been recognized that waves are a significant potential source of energy. Various devices for relatively large scale wave energy collection have been suggested from time to time, but have not met with any real degree of commercial success. Many of these devices have been based on compressing and storing air as collected or after stepping up the air pressure by mechanical means. In the first instance, once the pressure of the storage tank has been raised an initial increment, small waves are no longer a contributor. In the second case, the means for stepping up the pressure consumes much of the energy.

It is believed that large scale wave energy collection systems suggested in the past have not only been inefficient, but have not shown economic justification because no other function was performed as a consequence of the energy collection or in conjunction therewith. Hence, the entire initial cost of the supporting structure for the energy collecting system had to be amortized against energy production. The present invention looks to the problem of safe water transport and transfer of oil as one means of economic justification for wave energy collection.

The risk of oil spills from tanker vessels has caused mounting opposition to the bringing of tankers into protected harbors and waterways. At the same time the ever increasing demands for oil and the dependence of most of the world for its oil on a relatively few oil producing regions, has resulted in a relatively rapid buildup of tanker fleets and larger vessels. For the United States, the problem of oil transport by water will shortly be compounded with the start-up of the Alaska pipeline and the need to move the oil by water from the southern terminal of the pipeline to West Coast points.

Offshore ocean oil terminals have been suggested as a possible solution including the building of islands by rock fill or in the form of structural platforms rigidly fixed to the ocean floor at relatively shallow offshore sites. This proposed island solution is estimated to be not only extremely expensive, but to present major design difficulties in terms of providing protected moorage for all wind directions and wave conditions. It also requires that energy be supplied to the island by underwater cable or that the island have a fuel consuming generating plant. The latter necessitates a fuel storage facility and a fuel delivery operation.

SUMMARY OF THE INVENTION

The present invention aims to provide a more efficient system for wave energy collection and for converting wave energy into electrical energy.

Another object is to provide a wave energy system which together with its supporting structure performs another function.

The present invention also aims to provide a floating offshore facility which provides a protected moorage for most wave conditions encountered and which normally can be self-sufficient as respects its energy requirements.

The invention further aims to provide such a facility in a form which is economically feasible when adapted to serve as an oil tanker terminal.

In carrying out the objectives of the present invention there is provided a combination floating breakwater and wave energy collector. The breakwater comprises a pair of joined floating spread wings between which a vessel can be moored. The spread angle of the wings is adjustable and the wings can be jointly swung about their juncture so as to extend from the juncture generally in the direction of wave and wind travel so that the vee-shaped area between the wings is on the lee side. The wings have rows of improved wave energy collecting cells used to drive air turbines coupled to electric generators without intermediate compressed air storage and this energy conversion assists in dampening the wave action in the moorage zone between the wings. The wave energy collecting cells vary in depth for various wave sizes. An underwater pipeline is used to carry oil unloaded from a moored tanker from the breakwater site to shore. Likewise a cable can transmit any surplus electrical energy for use on shore.

BRIEF DESCRIPTION OF THE DRAWINGS

In the accompanying drawings:

FIG. 8 is a plan view of a modified installation changing the location of the monobuoy;

FIG. 9 is a plan view of a second modified installation.

FIG. 10 is a third modification showing a side elevational view of a typical mooring and loading column.

FIG. 10A is a plan view of the same column of FIG. 10 together with a platform and protective boom enclosing an oil tanker.

FIG. 11 is a plan view of a mobile fourth modified installation; and

FIG. 12 is a fragmentary perspective view of a modified front hinge arrangement for the breakwater.

DETAILED DESCRIPTION OF THE PREFERRED EMBODIMENT

Figure 1:
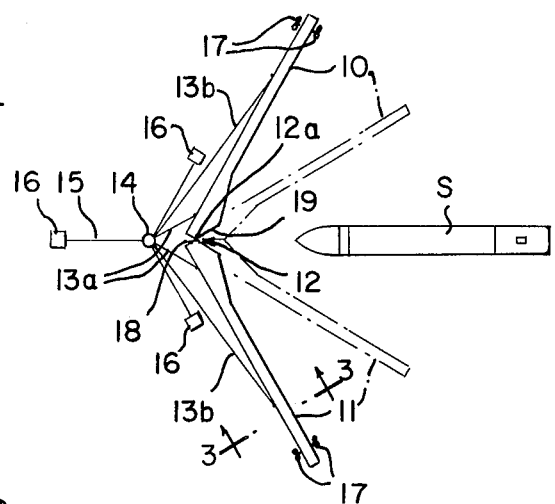
FIG. 1 is a plan view of a typical installation of the combined floating breakwater and energy collecting system of the present invention.
Figure 2:
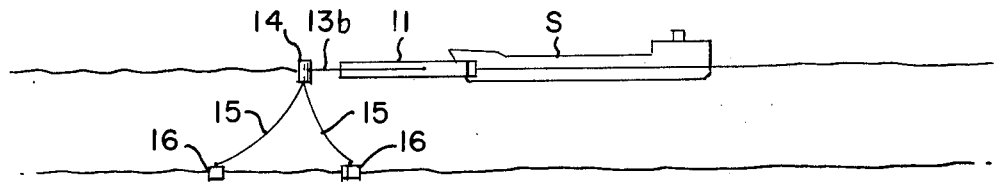
FIG. 2 is a side elevational view of the installation.

The invention embodies a pair of elongated floating platforms 10-11 arranged as adjustable breakwater wings. In the embodiment of FIG. 1 the wings swing from a central juncture 12 and mooring lines 13a, 13b connect both end portions of the wings to a turntable monobuoy 14 held in position by cables 15 extending to an array of bottom anchors 16. The mooring lines are connected to cable winches on the platforms and the length of the lines 13a, 13b can be varied to adjust the wing spread. Near their outer ends the platform wings 10-11 may be provided with suitable propulsion means for assisting in adjustment of the wing spread. This propulsion means can take the form of tunnel thrusters, water jets, steerable propellers or the like, and is designated 17 in the drawing.

The inner nose portions of the wings 10-11 are shaped as shown in FIG. 1 to provide abutting curved bearing surfaces 12a—12a and opposing stop faces 18—18 and 19—19 adjoining the front and lea sides, respectively, of the wings. The front stop faces 18 determine the maximum spread angle and the lea stop faces 19 establish the minimum spread angle of the wings. The minimum spread angle is intended for use in heavy seas and it is intended that in normal sea conditions the spread angle will be about half way between the minimum and 180°.

Basic to the present invention is the use of energy collecting cells 20 for converting wave energy to a useable form of energy to thereby assist in quieting the wave action on the lee side of the breakwater and make the breakwater self-sufficient as far as its energy requirements are concerned. It is contemplated that in some instances the power generated may be sufficient to warrant being transmitted to shore, in which case underwater electrical cables can be connected to the bottom anchored component of the turntable buoy 14 and be electrically connected to terminals in the upper turntable component of the buoy to which cables from the breakwater are joined. Energy generated on the breakwater can of course also be utilized by ships moored on the lee side of the breakwater by mooring lines to the platforms 10-11 or independently anchored.

Figure 3:
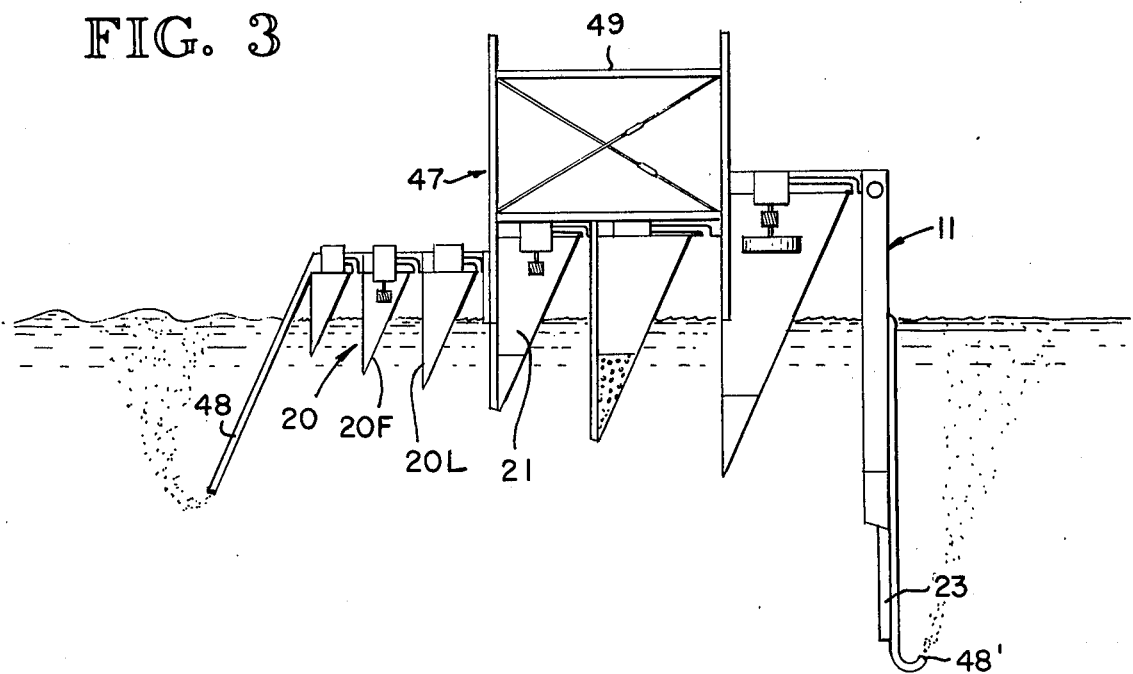
FIG. 3 is a vertical cross-sectional view taken as indicated by 3—3 of FIG. 1.

The energy collecting cells 20 are arranged in side-by-side rows extending lengthwise of the breakwater wings and function as a consequence of the rise and fall of the waves therein. The bottom of the breakwater wings is sloped so that the draft increases toward the lea side where a deep keel 23 is provided. The keel is intended to stop waves and provide reflected waves to create standing waves for increased efficiency. The collector cells become increasingly deeper as the breakwater draft increases and they are also made increasingly wider from one row to the next in the direction of the lea side as can be seen in FIG. 3. It will also be noted in FIG. 3 that the front wall 20F of each cell is sloped upwardly in the lea direction and that the lea wall 20L of each cell is generally vertical. Hence, in lateral cross section the collector cells have an inverted vee shape. As a consequence, generally vee-shaped flotation/storage/ballast chambers 21 are also formed in the hull. These compartments can be partially and selectively flooded for energy tuning or for maximum stability.

Figure 5:
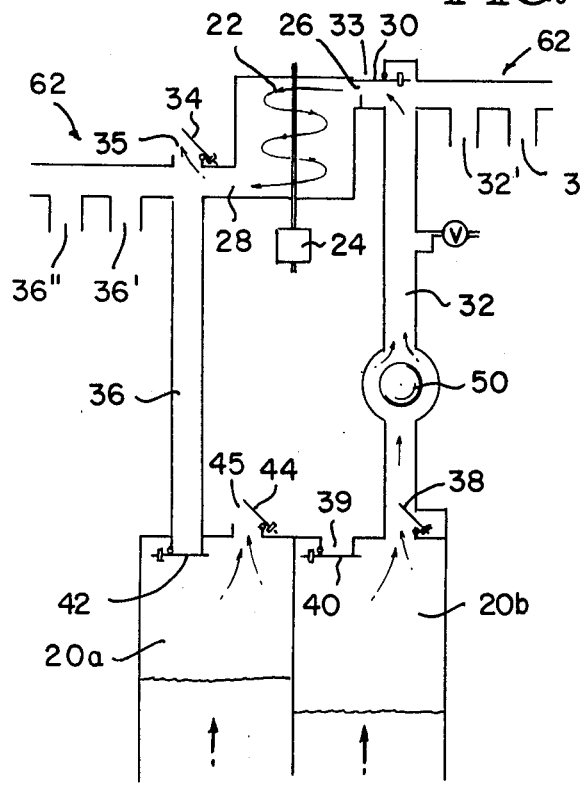
FIGS. 5 and 6 are schematic views of the pressure and vacuum phases of the energy collectors.
Figure 6:
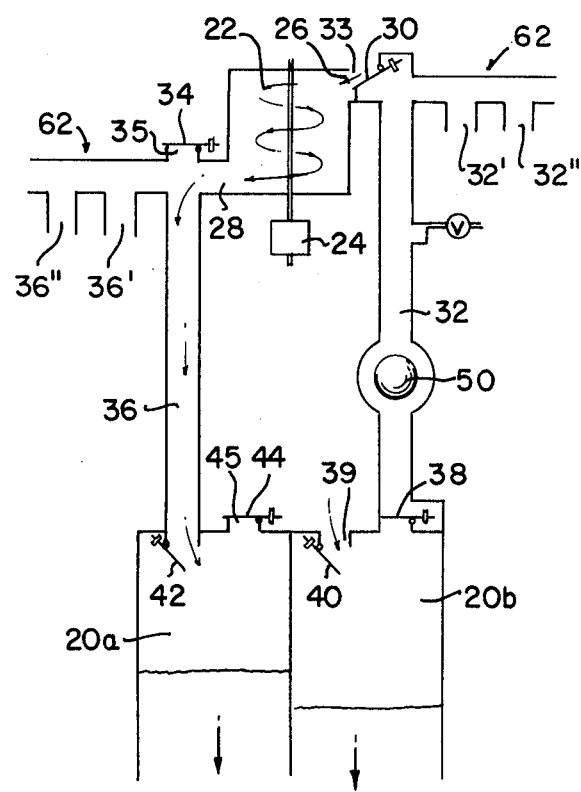

It is preferred to utilize both positive (pressure) and negative (vaccum) collectors in the system and to link both types to a common turbine. The valving arrangement for accomplishing this result is shown in FIGS. 5 and 6 wherein collector 20a is a negative collector and 20b is a positive collector. A conventional low pressure air turbine 22, shown schematically, is coupled to an electric generator 24 and has its intake and exhaust ports designated 26 and 28, respectively. Gravity balanced valve 30 controls the intake for port 26 so that intake comes from the positive collector 20b via pressure duct 32 during the pressure phase, and is drawn in from the atmosphere at 33 during the vacuum phase. Similarly, a gravity balanced valve 34 controls the exhaust for port 28 so that exhaust discharges to the atmosphere at 35 during the pressure phase and is drawn to the negative collector 20a through vacuum duct 36 during the vacuum phase.

At the positive collector 20b a gravity balanced valve 38 at the lower end of duct 32 is arranged to open during the pressure phase and a gravity balanced valve 40 is arranged to connect the positive collector to the atmosphere at port 39 during the vacuum phase. The valves for the positive collector are complemented by a gravity balanced valve 42 at the lower end of vacuum duct 36 which is arranged to open during the vacuum phase, and a gravity balanced valve 44 arranged to connect the negative collector to the atmosphere at port 45 during the pressure phase.

Figure 7:
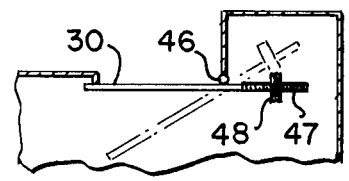
FIG. 7 is a detail view of one of the gravity valves used in the energy collectors.

As shown in FIG. 7, for valve 30 for example, each of the valves 30, 34, 38 and 42 is hinged at 46 and has a screw extension 47 on which weights 48 are threaded to act as an adjustable counterbalance for the valve proper. The screw extensions 47 may be positioned to slope downwardly at a slight angle relative to the respective valve to favor the closed position. This can also be accomplished by having the center of gravity of the weights 48 slightly below the longitudinal axis of the extensions 47. By such means the valves can be adjusted to swing open or close with minimal pressure change.

On a rising wave (FIG. 5) air is vented from collector 20a through valve 44 which lifts open while valve 42 lifts closed responsive to the increase in air pressure as the air in the collector is compressed by the rising water. At the same time the increase in air pressure in collector 20b causes valve 40 to close and valve 38 to open whereupon air is forced into the pressure duct 32 and flows past a wave blocking float valve 50 to the intake valve 30 as the pressure builds, and the valve 30 responsively swings upwardly into a closed position blocking the port 33. As the pressure phase continues the compressed air from the pressure chamber 20b drives the air turbine 22 and discharges to the atmosphere through port 34.

It will be noted that since the vacuum collectors 20a vent to the atmosphere during the pressure phase and hence normally provide less resistance to the rising water than is the case in the pressure collectors 20a, the water level achieved in the vacuum collectors may be higher than in the pressure collectors. This may be of assistance in maximizing performance during the vacuum phase which commences as the water starts to drop in the collectors. The resulting pressure drop in the vacuum collector causes valve 44 to drop closed and valve 42 to drop open as indicated in FIG. 6 and likewise, the valves 38 and 40 drop closed and open, respectively, responsive to the pressure drop in the pressure collector. As a consequence, valve 30 drops open exposing the intake port 26 to the atmosphere, and valve 34 drops closed. Accordingly, the increasing vacuum condition in vacuum collector 20a causes air to be drawn in past valve 30 and through the air turbine whereupon it flows through the duct 36 to the vacuum collector.

From the foregoing description it is seen that the turbine 22 is driven through both the rising and falling phases of a wave cycle. Although for purposes of example only one pressure collector and one vacuum collector have been shown operatively connected to each turbine 22 in detail, it will be apparent that additional ducts 32', 32" can feed from several pressure collectors and that additional ducts 36', 36" can feed to a like number of vacuum collectors. Also, because the wings will generally not be parallel to wave fronts, there may be a continuous rather than intermittent air flow.

Instead of a common turbine linked to both positive and negative air collectors, for some erratic sea conditions it may be preferable to use separate turbines for the vacuum and pressure phases. This can be accomplished by using suitable valves to redirect the air flow.

Rather than having the floating platforms 10-11 coupled together directly, an intermediate floating hub may be provided which is coupled to the platforms. For example, as shown in FIG. 8, the monobuoy 14' can be coupled at opposite bearing surfaces 12a, 12a' of floating platforms 10a-11a instead of being spaced forwardly of the platforms and connected thereto by mooring lines.

FIG. 9 illustrates a ring of anchor blocks 16 providing multiple anchoring points via lines 15' for the floating platforms 10, 11. When the wave direction, indicated by arrow W, changes to W' the anchoring points can be repositioned on the floating platforms to head into the waves as shown in dotted lines and better protect the drilling rig S, or other vessel behind the platforms.

FIGS. 10 and 10A illustrate still a further embodiment in which a conventional mooring column 70 is anchored to the ocean bottom by lines 15 and anchors 16 and is coupled at its upper end to the floating platforms 10, 11 by mooring lines 13. Winches on the platform wings control hausers to the single mooring column. A floating boom 71 encircles the rest of the oil tanker or other vessel S to confine any spilled oil.

As shown in FIG. 11, as a further alternative the hub between the floating platforms can comprise a self-propelled vessel 60 hinged at its sides to platforms 10c-11c at pivots 12c-12c' on suitable outriggers on the vessel. Such an arrangement is intended for use, for example, in ocean mining operations where a relatively quiet mooring area is desirable for support vessels and barges and the mining site is changed from time to time. When the vessel 60 is underway to move to or from port, or to another mining location, the platform wings can be folded against the vessel hull so as to generally parallel the longitudinal axis of the vessel. In this case the propulsion means at the stern of the wings is preferably of the steerable type so that it can be used to supplement the propulsion system of the vessel to forwardly propel the vessel and the platform wings as a unit. Outrigger hausers 88 can hold the wing positions.

FIG. 12 illustrates a modified front pivot for platforms 10d, 11d comprising a rounded convex nose 55 on the platform 10d and a matching rounded concave nose 56 on the platform 11d. A twin-spool cable winch 57 on the platform 10d has one cable 58a dead ended on a top center post 59a on the nose 56 and has a second cable 58b passing down through a pipe in the center of the nose 55 and passing across to a dead end on a bottom center post 59b on the nose 56. Tensioning of the cables 58a, 58b keep the noses 55, 56 snubbed together. Additional crossed cables may of course be provided. Opposed stops 19'—19' can be provided to limit the amount of inward swinging travel of the platforms.

Figure 4:
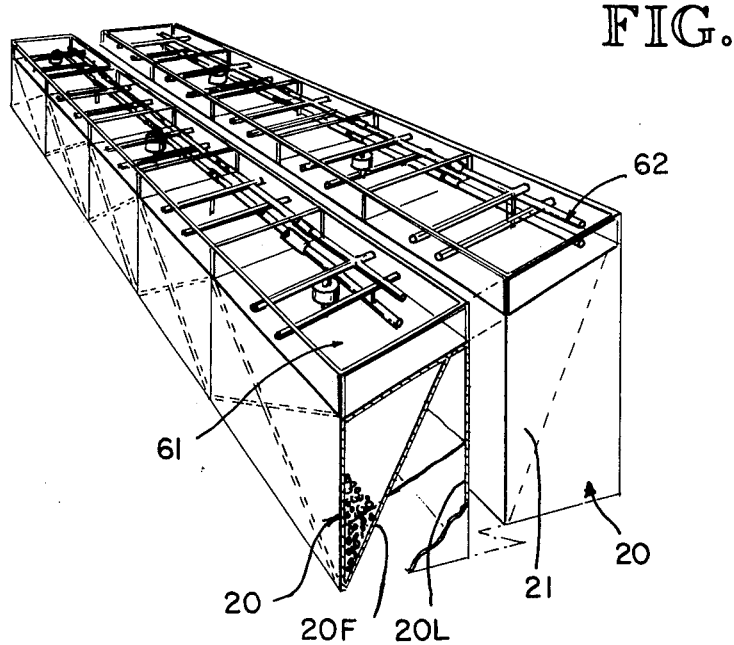
FIG. 4 is a partially exploded perspective view illustrating two rows of typical hull modules.

Standard ship construction techniques may be utilized to build the breakwater wings. For economic reasons it is preferred that a modular construction system be utilized such as indicated, for example, in FIG. 4. Each module may comprise a row of progressively larger flotation chambers and energy collecting cells covered by suitably cross-braced plates at the front, back, sides and top. The cells are subdivided by respective braced sloped baffle walls 20F dividing the cells into the energy collectors 20 and flotation chambers 21. At their upper ends the cells are closed to provide the deck surface 61, and access to the flotation chambers is provided by standard marine hatches. A manifold system 62 on the deck can be utilized to interconnect the various cells, modules and air turbines as desired and suitable isolation and bypass valves (not shown) are provided. It is preferred to have a raised central walkway 49 which may be provided on a permanent deck scaffold 47 along the floating platforms and connect by ladders to the deck proper for access to deck hatches and the manifold valves.

Energy storage aboard the breakwater may take a variety of forms. Banks of batteries may be charged from the electrical generators and banks of air bottles may be charged with compressed air. Kinetic energy can be stored by driving flywheels. On large installations hydrogen and oxygen may be generated. The necessary equipment can be housed in the flotation chambers 21.

It has been known that wave action can be dampened by injecting compressed air at depth. Accordingly air ejection nozzles 48, 48' connecting to an output manifold from the ducts 32 of a bank of pressure cells 20b or from air compressors driven by electric motors or the air turbines 22, are placed underwater to the front and lea, respectively, of the floating platforms 10-11 to further assist in dampening the wave action. Compressed air lines can also follow the anchor lines for greater effectiveness in attenuating large waves.

The embodiments of the invention in which a particular property or privilege is claimed are defined as follows:

1. A combination floating breakwater and energy collector comprising:
   floating platform means having a front side and a lea side, and containing a plurality of wave energy collection means arranged to receive waves advancing generally toward said front side,
   said collection means comprising collection chambers open to the bottom and each having a relatively vertical back wall and a sloped front wall sloping in the lea direction from the bottom for receiving waves, said collection chambers being arranged in a plurality of rows located side-by-side from said front side to the lea side of the floating platform means, and being progressively larger in width and depth from the frontmost row to the leemost row,
   converting means on said platform means for converting the wave energy collected at said cells into a transmittable form of energy, and
   positioning means for selectively positioning said floating platform means so that its front side will be generally directed toward the oncoming waves whereby the wave action on the lea side of the platform is reduced as a consequence of wave deflection by said floating platform means and of the wave energy collected by said cells.

2. A combination floating breakwater and energy collector according to claim 1 in which said floating platform means comprises a pair of elongated floating spread wings, and center means for interconnecting the inner ends of said wings whereby the spread of the wings can be varied by said positioning means.

3. A combination floating breakwater and energy collector according to claim 1 in which said positioning means includes an array of bottom anchors and floating turntable means connected to said anchors and to the floating platform means whereby the latter can be turned in the water relative to said anchors.

4. A combination floating breakwater and energy collector according to claim 1 in which the draft of said floating platform means increases from its front side to its lee side.

5. A combination floating breakwater and energy collector according to claim 1 in which the collection chambers are progressively larger in width and depth from the frontmost row to the leemost row.

6. A combination float breakwater and energy collector according to claim 1 in which said rows are separated by flotation chambers having a generally vertical front outer wall and an upwardly sloped lee back wall formed by the vertical back wall and sloped front wall of adjoining said collection chambers.

7. A combination floating breakwater and energy collector according to claim 1 in which said wave energy collection means comprises a plurality of pressure cells and a plurality of vacuum cells operating, respectively, in pressure and vacuum phases of an operating cycle, said converting means comprising a plurality of air turbines and valve and duct means selectively connecting said turbines to said pressure and vacuum cells whereby the air turbines are powered by compressed air from the pressure cells flowing directly from the pressure cells, without intermediate storage, through the turbines to the atmosphere during the pressure phase of each operating cycle and are powered by atmospheric air flowing through the turbines to the vacuum cells during the vacuum phase of each operating cycle, and whereby the air flow through said turbines is in the same direction during the pressure and vacuum phases.

8. A combination floating breakwater and energy collector according to claim 1 in which the platform means has a downwardly projecting keel near its lee side, and in which the bottom profile of the platform means slopes downwardly from the front side to the base of said keel.

9. A combination floating breakwater and energy collector comprising:
a pair of elongated floating spread wings and having a front side and a lee side and containing a plurality of wave energy collection means arranged to receive waves advancing generally toward said front side, and
center means for interconnecting the inner ends of said wings whereby the spread of the wings can be varied, said center means comprising a self-propelled vessel having said wings pivotally connected thereto on opposite sides thereof.

10. A wave energy collector comprising, an elongated floating hull having a front side and a lee side, and a keel adjacent said lee side, the draft of said hull gradually increasing from its front side to the keel,
longitudinal rows of wave energy collection chambers in the hull open to the bottom and each having a relatively vertical back wall and a sloped front wall sloping in the lea direction from the bottom for receiving waves,
and converting means on said hull communicating with said chambers for converting the wave energy collected at said cells into another form of energy.

* * * * *